July 26, 1927.
A. E. THORNLEY
REFRIGERATING APPARATUS
Filed April 30, 1926
1,636,877
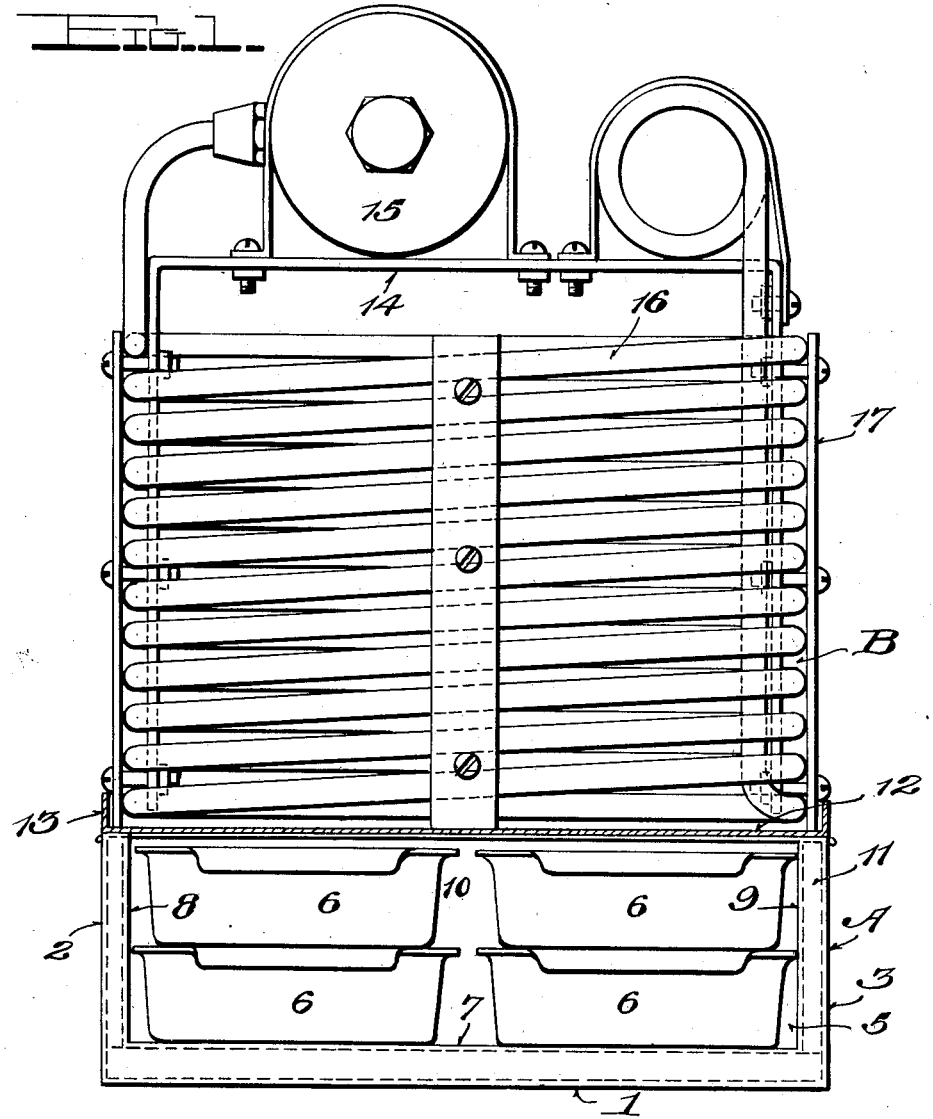
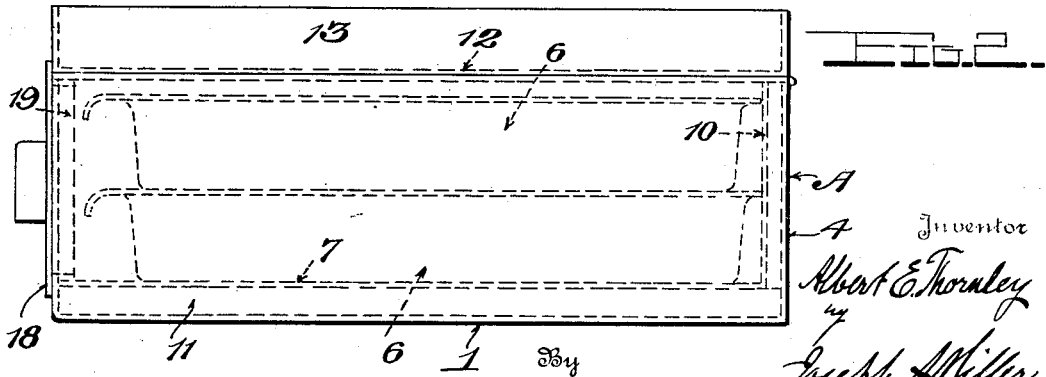
Inventor
Albert E. Thornley
by
Joseph A. Miller
Attorney Patented July 26, 1927.

1,636,877

UNITED STATES PATENT OFFICE.

ALBERT E. THORNLEY, OF PAWTUCKET, RHODE ISLAND, ASSIGNOR TO NARRAGANSETT MACHINE COMPANY, OF PAWTUCKET, RHODE ISLAND.

REFRIGERATING APPARATUS.

Application filed April 30, 1926. Serial No. 105,691.

This invention relates to certain new and useful improvements in refrigerating apparatus and relates more particularly to an apparatus for household use, but which may be used for other types of cooling plants.

An important object of this invention is to provide a container in conjunction with a brine tank or coil which, while providing means to absorb heat from the material placed in the freezing chamber, is so insulated as to prevent the absorption of heat from the surrounding atmopshere, by the materials in the container.

Another important object of the present invention is to provide a structure of the above mentioned character wherein a household refrigerating apparatus is supported upon a base which latter forms an insulated container into which pans containing water or other materials may be placed, to cool the same.

A further object of the invention is to provide an apparatus of the character described, wherein the several parts are readily demountable for renewal or cleaning.

A still further object of this invention is to provide an apparatus of the above mentioned character which is simple in construction, durable and efficient in operation and which may be manufactured at a reasonable cost.

In the drawings:—

Figure 1 is a front elevation, partly in section, of the insulated container surmounted by one form of refrigerating apparatus and Figure 2 is a side elevation of the container, with the refrigerating apparatus removed therefrom.

Referring more in detail to the drawings, A designates generally the container and B one type of household refrigerating apparatus. The container A is formed to provide outer bottom, side and end walls 1, 2, and 3, and back wall 4 respectively, the front 5 thereof being open to permit the placing of trays 6 therein adapted to receive the materials to be cooled.

The container A is further formed with inner bottom, side and end walls 7, 8, 9 and back wall 10 respectively spaced from the walls 1, 2, 3 and 4 to provide a dead air space 11, therebetween. It is to be understood however, that any other form of insulation may be provided for the bottom, side and walls of the container, than that shown.

A top 12 of the container is formed of a single sheet of material having its marginal edges bent upwardly to form a flange 13 to provide a pan or receptacle to catch the drippings from the refrigerating apparatus B.

The refrigerating apparatus includes a frame 14 adapted to support a brine tank 15 having a coil 16 depending therefrom and secured to the frame by clamping strips 17, the lower ends of which extend below the coil to provide legs whereby the apparatus is supported upon the top 12 of the container.

In use, the heat from the materials placed in the container is absorbed by the refrigerating apparatus through the non-insulated top wall 12 of the container which top is also formed to provide a pan to receive the drippings from the coil 16. The insulating space between the bottom, side and end walls is provided to prevent the absorption of heat from the outside atmosphere, by the materials placed in the container to be cooled.

Further, the materials in the container are more quickly cooled by reason of the fact that the heat is first absorbed by the wall 12 and maintained cool by the drip from the coil 16.

Having thus described my invention, what I claim as new and desire to secure by Letters Patent is:—

1. In combination with a refrigerating apparatus including a frame, a coil and vertical strips clamping the coil to the frame and having their lower ends projecting below the frame to provide supporting legs, a supporting base having a heat absorbing top and being formed to receive material to be cooled, said top having upwardly extending flanges to provide a tray so as to collect dripping from the refrigerating apparatus, the legs of the apparatus being removably received within the tray and supported thereby.

2. In a device of the type set forth, a hollow supporting base formed to receive material to be cooled and having a heat absorbing top of substantially tray form, and a refrigerating apparatus demountably supported by the top and disposed so as to enable the top to collect drippings from the refrigerating apparatus.

3. In a device of the type set forth, a refrigerating apparatus and a hollow supporting base for the apparatus formed to receive material to be cooled and having a heat absorbing top formed to collect drippings from the apparatus, said apparatus being demountably supported from the top.

4. In a device of the type set forth, a hollow supporting base formed to receive material to be cooled and having a heat absorbing top, a refrigerating apparatus, legs carried by the refrigerating apparatus and engaging the top so as to demountably support the apparatus from the base, and means to restrict movement of the legs laterally of the top.

In testimony whereof I have hereunto set my hand this 19th day of April, 1926.

ALBERT E. THORNLEY.